(12) United States Patent
Mochizuki et al.

(10) Patent No.: US 10,120,396 B2
(45) Date of Patent: Nov. 6, 2018

(54) CONTROL DEVICE FOR MACHINE APPARATUS AND GAIN DETERMINATION METHOD FOR FRICTION COMPENSATION

(71) Applicant: MITSUBISHI HEAVY INDUSTRIES, LTD., Tokyo (JP)

(72) Inventors: Keisuke Mochizuki, Tokyo (JP); Ichiro Awaya, Tokyo (JP); Katsuyoshi Takeuchi, Tokyo (JP); Hirohisa Kuramoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 189 days.

(21) Appl. No.: 15/107,308

(22) PCT Filed: Feb. 20, 2015

(86) PCT No.: PCT/JP2015/054743
§ 371 (c)(1),
(2) Date: Jun. 22, 2016

(87) PCT Pub. No.: WO2015/125909
PCT Pub. Date: Aug. 27, 2015

(65) Prior Publication Data
US 2016/0363939 A1    Dec. 15, 2016

(30) Foreign Application Priority Data
Feb. 21, 2014    (JP) .................. 2014-031686

(51) Int. Cl.
*G05D 17/00* (2006.01)
*G05D 17/02* (2006.01)
(Continued)

(52) U.S. Cl.
CPC ............. *G05D 17/02* (2013.01); *G05B 13/02* (2013.01); *G05B 13/0205* (2013.01);
(Continued)

(58) Field of Classification Search
CPC ...... G05D 17/02; G05D 3/00; G05B 13/0205; G05B 13/02; G05B 19/404
See application file for complete search history.

(56) References Cited

U.S. PATENT DOCUMENTS 5,517,100 A    5/1996 Matsubara et al.
6,252,368 B1 *    6/2001 Sugie .................. G05B 19/404
                                                                318/568.22
(Continued)

FOREIGN PATENT DOCUMENTS

JP    04-017591 A    1/1992
JP    04-23017 A    1/1992
(Continued)

OTHER PUBLICATIONS

Extended European Report dated Nov. 14, 2016 for corresponding European Patent Application No. 15752106.3.

*Primary Examiner* — Vincent Tran
(74) *Attorney, Agent, or Firm* — Birch, Stewart, Kolasch & Birch, LLP

(57) ABSTRACT

The purpose of the present invention is to further improve the accuracy of position control of a machine apparatus. A control device for a machine apparatus is equipped with: a speed control unit for calculating a torque command for the machine apparatus; a friction estimation unit for calculating an estimated value of the friction force produced by the machine apparatus; an amplitude phase adjustment unit for calculating a corrected friction value by multiplying the proportional gain by the friction force estimated by the friction estimation unit; and a correction unit for correcting the torque command by using the corrected friction value calculated by the amplitude phase adjustment unit. Furthermore, the proportional gain is determined on the basis of the gain properties of the transfer function of the machine
(Continued)

apparatus from the position command to the position deviation.

5 Claims, 10 Drawing Sheets

(51) Int. Cl.
    *G05B 13/02*     (2006.01)
    *G05B 19/404*     (2006.01)
    *H02P 6/17*     (2016.01)

(52) U.S. Cl.
    CPC .............. *G05B 19/404* (2013.01); *H02P 6/17* (2016.02); *H02P 2205/07* (2013.01)

(56) References Cited

U.S. PATENT DOCUMENTS

| | | | |
|---|---|---|---|
| 2003/0201746 A1* | 10/2003 | Eguchi | G05B 19/404 318/567 |
| 2004/0135536 A1* | 7/2004 | Iwashita | G05B 19/39 318/652 |
| 2007/0007927 A1* | 1/2007 | Terada | G05B 5/01 318/630 |
| 2011/0050146 A1* | 3/2011 | Okita | G05B 19/404 318/631 |
| 2014/0028224 A1* | 1/2014 | Arima | H02P 21/0096 318/400.02 |
| 2014/0046548 A1 | 2/2014 | Mukai et al. | |
| 2015/0112551 A1* | 4/2015 | MacLaughlin | B62D 5/0463 701/41 |
| 2015/0367883 A1 | 12/2015 | Mukai et al. | |
| 2016/0149523 A1* | 5/2016 | Yoshiura | H02P 6/001 318/432 |
| 2016/0280255 A1* | 9/2016 | Wilhelm | B62D 5/0463 |

FOREIGN PATENT DOCUMENTS

| | | |
|---|---|---|
| JP | 05-19862 A | 1/1993 |
| JP | 09-074783 A | 3/1997 |
| JP | 9-282008 A | 10/1997 |
| JP | 3285681 B2 | 5/2002 |
| JP | 2002-258922 A | 9/2002 |
| JP | 2007-336687 A | 12/2007 |
| JP | 2008-210273 A | 9/2008 |
| JP | 2014-002474 A | 1/2014 |
| WO | WO 2006/011203 A1 | 2/2006 |

\* cited by examiner

CONTROL DEVICE FOR MACHINE APPARATUS AND GAIN DETERMINATION METHOD FOR FRICTION COMPENSATION

TECHNICAL FIELD

The present invention relates to a control device for a machine apparatus and to a gain determination method for friction compensation.

BACKGROUND ART

A machine apparatus such as a machine tool for which high accuracy positioning is required involves the problem of degradation of the accuracy of control due to friction. Particularly, a reciprocating motion such as a movement starting again after a stoppage is subject to friction, and there is the possibility of an increase in a position deviation that corresponds to a deviation between a position command and the position of a load shaft. Thus, performed is a control that compensates for friction produced in the machine apparatus.

As a friction compensation method for the machine apparatus of the related art, there is a method that experimentally adjusts in advance the amount of correction and the timings of the correction start and the correction end for friction and adds the amount of correction to a speed command and to a torque command. However, in this method, properties of friction change temporally or differ according to drive conditions or for each machine apparatus, thereby requiring time for the adjustment.

As another friction compensation method, there is a method that estimates a friction force of the machine apparatus using a friction model and compensates for an actual friction force on the basis of the estimated friction force. Types of friction compensation methods that use friction models include a feedforward type that estimates a friction force from a position command or a control command such as a target value and a feedback type that estimates a friction force from an actual position or a speed.

The friction compensation methods that use friction models provide simpler adjustment than the above method that uses the amount of correction, provided that the accuracy of estimation of a friction force is high.

As an example, in PTL 1, there is disclosed a motor control device that controls a motor using feedback control, the device including a disturbance torque observer that estimates a disturbance torque of the motor in order to reduce influence of disturbance due to friction upon reversal of the motor, in which an output value of the disturbance torque observer is controlled by a variable gain upon other than the reversal of the motor.

CITATION LIST

Patent Literature

[PTL 1] Japanese Unexamined Patent Application Publication No. 9-74783

SUMMARY OF INVENTION

Technical Problem

There exists a plurality of places of occurrence of friction produced in the machine apparatus, such as a drive shaft, a load shaft, and an intermediate shaft (for example, a ball screw) that transfers a force between the drive shaft and the load shaft.

A signal of the position of the load shaft that is a controlled and observed amount is the total value of friction forces produced at the plurality of places of occurrence including torsion and resonance and inhibits an improvement in the accuracy of control of the machine apparatus.

Even if a force that corresponds to friction compensation (corrected friction amount) is applied to the drive shaft in order to perform friction compensation, influence of shaft torsion or deadbands of gears (mechanical backlash) delays transfer of force or causes a loss of force when the force is transferred from the drive shaft to the intermediate shaft or to the load shaft.

Therefore, even if the corrected friction amount that is the same as the entire friction force of the machine apparatus is applied to the drive shaft, actual friction of the machine apparatus may not be accurately compensated.

The present invention is conceived in view of such circumstances, and an object thereof is provision of a control device for a machine apparatus and a gain determination method for friction compensation capable of improving the accuracy of position control of the machine apparatus.

Solution to Problem

In order to resolve the above problem, a control device for a machine apparatus and a gain determination method for friction compensation of the present invention employ the following means.

A control device for a machine apparatus according to a first aspect of the present invention includes torque command calculation means for calculating a torque command for the machine apparatus, friction estimation means for calculating an estimated value of a friction force produced in the machine apparatus, adjustment means for calculating a corrected value by multiplying the estimated value calculated by the friction estimation means by a predetermined gain, and correction means for correcting the torque command calculated by the torque command calculation means using the corrected value calculated by the adjustment means, in which the gain is determined on the basis of gain properties of a transfer function of the machine apparatus from a position command to a position deviation.

According to the above configuration, the torque command for the machine apparatus is calculated by the torque command calculation means, and the estimated value of the friction force produced in the machine apparatus is calculated by the friction estimation means in order to compensate for friction produced in the machine apparatus.

However, influence of shaft torsion or deadbands of gears (mechanical backlash) delays transfer of force or causes a loss of force. Thus, simply correcting the torque command using the estimated value of the friction force does not result in high accuracy friction compensation.

Therefore, the adjustment means calculates the corrected value by multiplying the estimated value of the friction force by a predetermined gain, and the torque command is corrected by using the corrected value.

The gain by which the estimated value of the friction force is multiplied is determined on the basis of the gain properties of the transfer function of the machine apparatus from the position command to the position deviation.

This transfer function represents characteristics of an entire machine system including the machine apparatus and the control device performing friction compensation and includes information related to the position deviation. Since the extent to which the position deviation is generated in the current system configuration can be estimated from the gain properties of the transfer function, the gain by which the estimated value of the friction force is multiplied can be easily optimized.

Therefore, according to the above configuration, the accuracy of position control of the machine apparatus can be further improved.

It is preferable that, in the first aspect, the gain is determined on the basis of an area that is surrounded by the gain properties of the transfer function in a low frequency region and a predetermined threshold.

According to the above configuration, the gain by which the estimated value of the friction force calculated for friction compensation is multiplied can be easily determined.

It is preferable that, in the first aspect, the transfer function is derived by using linear analysis.

According to the above configuration, the gain by which the estimated value of the friction force calculated for friction compensation is multiplied can be easily determined.

A gain determination method for friction compensation according to a second aspect of the present invention is used in a control device that calculates an estimated value of a friction force produced in a machine apparatus, calculates a corrected value by multiplying the calculated estimated value by a predetermined gain, and corrects a torque command for the machine apparatus using the corrected value, the method including a step of deriving a transfer function of the machine apparatus from a position command to a position deviation, and a step of determining the gain on the basis of gain properties of the transfer function.

Advantageous Effects of Invention

The present invention has the favorable effect of providing capability to further improve the accuracy of position control of the machine apparatus.

DESCRIPTION OF EMBODIMENTS

Hereinafter, an embodiment of a control device for a machine apparatus and a gain determination method for friction compensation according to the present invention will be described with reference to the drawings.

Figure 1:
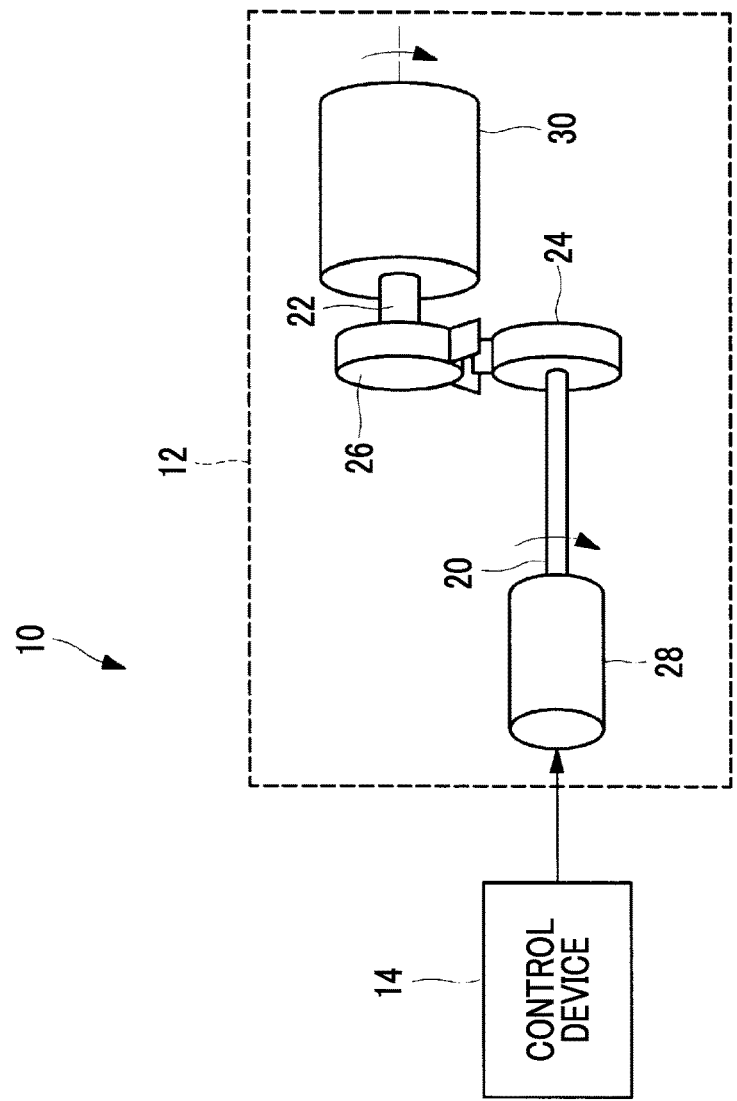
FIG. 1 is a schematic configuration diagram of a machine system according to an embodiment of the present invention.

FIG. 1 is a schematic configuration diagram of a machine system 10 according to the present embodiment.

The machine system 10 includes a machine apparatus and a control device 14 that regards the machine apparatus 12 as a control target.

In the machine apparatus 12, gears 24 and 26 are respectively disposed in a drive shaft 20 and a load shaft 22, and the gears 24 and 26 engage with each other to transfer a force of the drive shaft 20 to the load shaft 22. As an example, the drive shaft 20 is a rotating shaft of a motor 28 (so-called motor shaft), and the load shaft is a rotating shaft of a load 30. The machine apparatus 12 may include an intermediate shaft that transfers a force between the drive shaft 20 and the load shaft 22.

Figure 2:
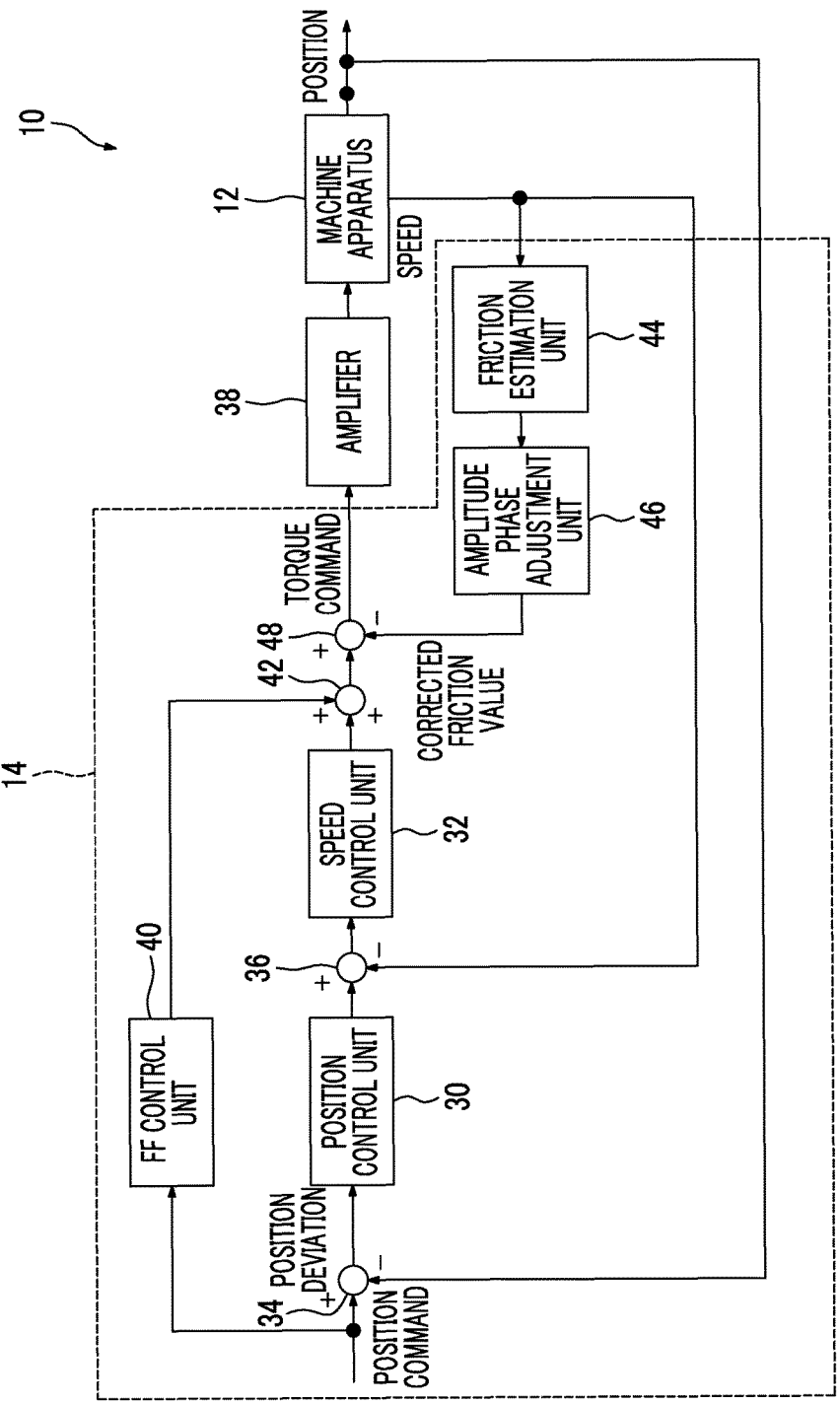
FIG. 2 is a functional block diagram illustrating a configuration of a control device according to the embodiment of the present invention.

The control device 14 controls the machine apparatus 12 on the basis of a deviation between the position of the load shaft 22 and a position command. FIG. 2 is a functional block diagram illustrating a configuration of the control device 14 according to the present embodiment.

The control device 14 is configured of, for example, a central processing unit (CPU); a random access memory (RAM), and a computer-readable recording medium. As an example, a series of processes for realizing various types of functions of the control device 14 is recorded in a program format in the recording medium or the like, and the CPU reads this program into the RAM or the like, processes information, and performs operation processing to realize various types of functions.

The control device 14 includes a position control unit 30 and a speed control unit 32.

The position control unit 30 calculates a motor speed command that indicates the speed of the drive shaft 20, on the basis of a deviation (hereinafter, referred to as "position deviation") between a position command indicating the position of the load shaft 22 (hereinafter, referred to as "load position") and a detected value of the load position. The position deviation is calculated by a subtraction unit 34.

The position control unit 30 calculates the motor speed command using, as an example, proportional control that uses the position deviation. The position of the load shaft 22 is, for example, an angle, and the speed of the drive shaft 20 is, for example, an angular speed.

The speed control unit 32 calculates a torque command that indicates a torque of the drive shaft 20, on the basis of a deviation (hereinafter, referred to as "speed deviation") between the motor speed command calculated by the position control unit 30 and a detected value of a motor speed that corresponds to the angular speed of the drive shaft 20 (motor 28). The motor speed deviation is calculated by a subtraction unit 36. The speed control unit 32 calculates the torque command using, as an example, proportional integral control that uses the motor speed deviation.

The torque command is amplified by an amplifier 38 and subsequently input to the motor 28. The motor 28 drives the drive shaft 20 on the basis of the amplified torque command.

The control device 14 includes an FF control unit 40. The FF control unit 40 calculates a corrected value of the torque command on the basis of the position command. This corrected value is added to the torque command by an addition unit 42. That is, the FF control unit 40 corrects the torque command in a feedforward manner and, as an example, calculates the torque command using acceleration feedforward compensation that uses an acceleration obtained by differentiating the position command twice. The control device 14 may not include the FF control unit 40.

Figure 3:
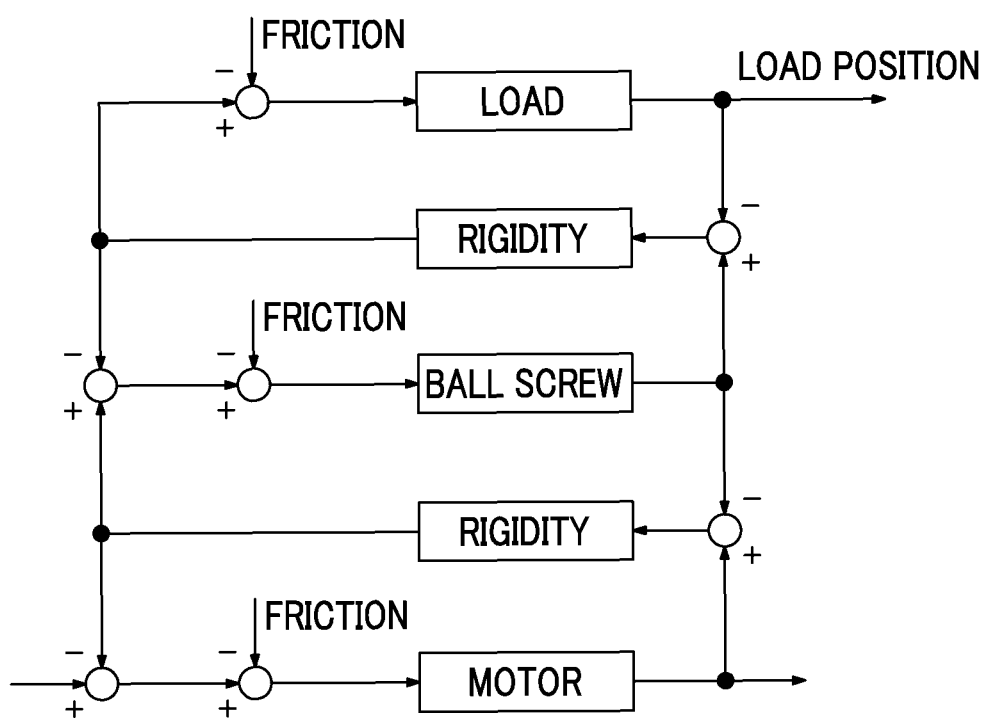
FIG. 3 is a block diagram of a machine apparatus that has friction.

FIG. 3 is a block diagram illustrating an example of the machine apparatus 12 that includes a three-inertia system and has friction.

As illustrated in the example of FIG. 3, three inertial bodies (motor, ball screw, and load) respectively correspond to the drive shaft, the intermediate shaft, and the load shaft, and each produces friction.

The control device 14 includes a friction estimation unit 44, an amplitude phase adjustment unit 46, and a correction unit 48 as a friction compensation function.

The friction estimation unit 44 calculates an estimated value of a friction force (hereinafter, referred to as "estimated friction value") produced in the machine apparatus 12. The friction estimation unit 44 according to the present embodiment calculates the estimated friction value by inputting the motor speed to a friction model that is built in advance.

However, influence of shaft torsion or deadbands of the gears 24 and 26 (mechanical backlash) delays transfer of force or causes a loss of force. Thus, simply correcting the torque command using the estimated friction value calculated by the friction estimation unit 44 does not result in high accuracy friction compensation.

Therefore, the amplitude phase adjustment unit 46 multiplies the calculated estimated friction value by a predetermined gain (hereinafter, referred to as "proportional gain Kc") to calculate a corrected friction value, thereby enabling higher accuracy friction compensation.

The correction unit 48 corrects the torque command using the corrected friction value by subtracting the corrected friction value from the calculated torque command and outputs the corrected torque command to the amplifier 38.

Next, a determination method for the proportional gain Kc used in the amplitude phase adjustment unit 46 will be described.

Figure 4:
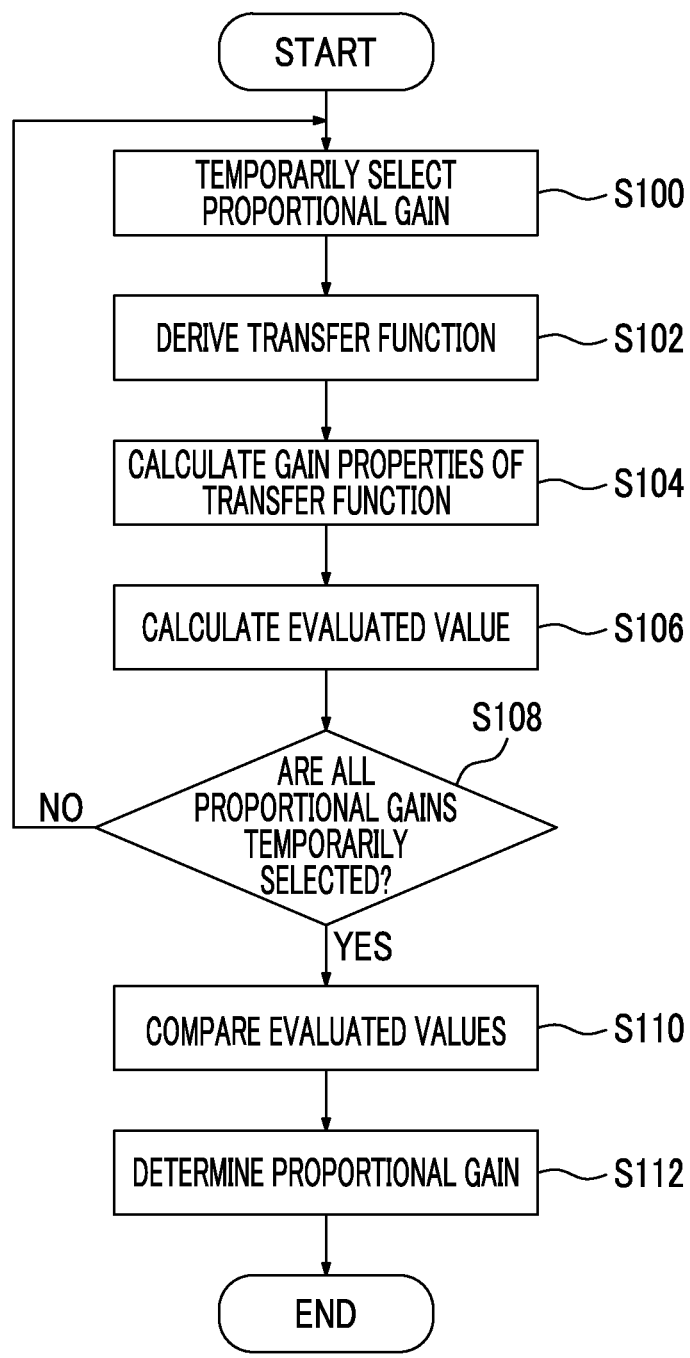
FIG. 4 is a flowchart illustrating a flow of a proportional gain determination process according to the embodiment of the present invention.

The proportional gain Kc is determined in advance by using an information processing apparatus. FIG. 4 is a flowchart illustrating a flow of a proportional gain determination process that determines the proportional gain Kc. The proportional gain determination process is recorded in a program format in a recording medium or the like included in the information processing apparatus.

First, in Step 100 (S100), the proportional gain Kc that is used in the amplitude phase adjustment unit 46 is temporarily selected. In the present embodiment, as an example, the proportional gain Kc is temporarily selected in the range of 0 to 10 per 0.25.

Next, in Step 102 (S102), a transfer function of the machine apparatus 12 from the position command to the position deviation is derived by using linear analysis.

This transfer function models the machine apparatus and is from the position command to the position deviation with respect to the machine apparatus 12. That is, the transfer function represents characteristics of the entire machine system 10 including the machine apparatus 12 and the control device 14 performing friction compensation and includes information related to the position deviation.

The friction model in the linear analysis considers, for example, only viscous friction that is proportional to speed as a friction parameter (viscous friction parameter). Elements such as the deadbands of the gears 24 and 26 are non-linear elements and thus are not considered in the linear analysis.

Deriving the transfer function using the linear analysis allows the proportional gain Kc, described later, to be easily determined.

Next, in Step 104 (S104), gain properties of the derived transfer function are calculated. The above information related to the position deviation is easily extracted from the gain properties of the transfer function.

Figure 5:
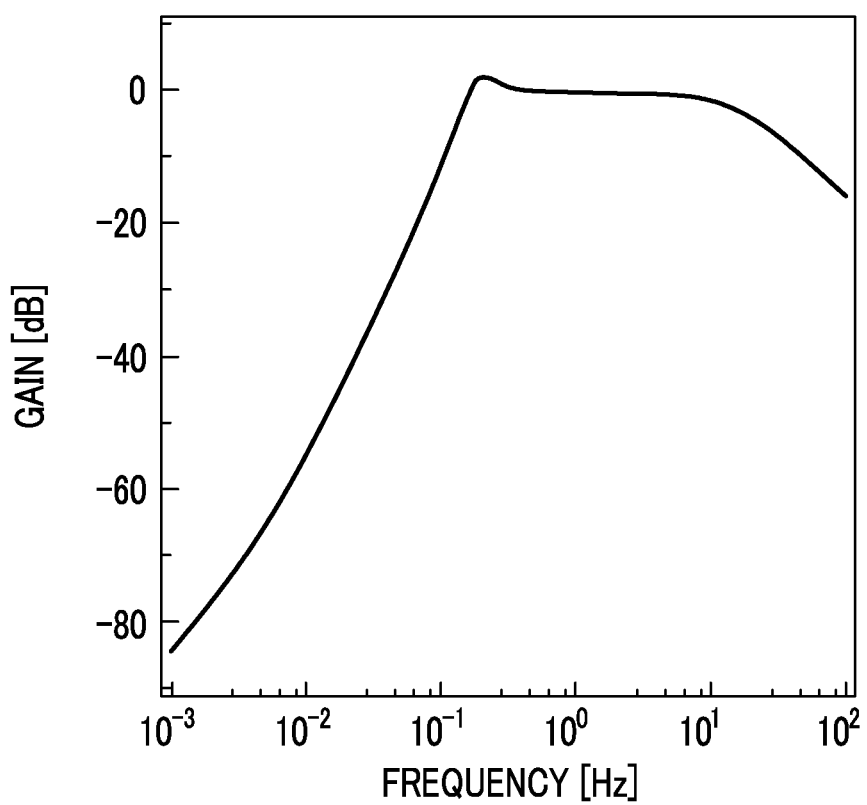
FIG. 5 is a graph illustrating an example of gain properties of a transfer function according to the embodiment of the present invention.

FIG. 5 is a graph illustrating an example of the gain properties of the transfer function according to the present embodiment, in which the horizontal axis (x axis) represents frequency and the vertical axis (y axis) represents gain.

Next, in Step 106 (S106), an evaluated value J that is used in determination of the proportional gain Kc is calculated on the basis of the gain properties.

Figure 6:
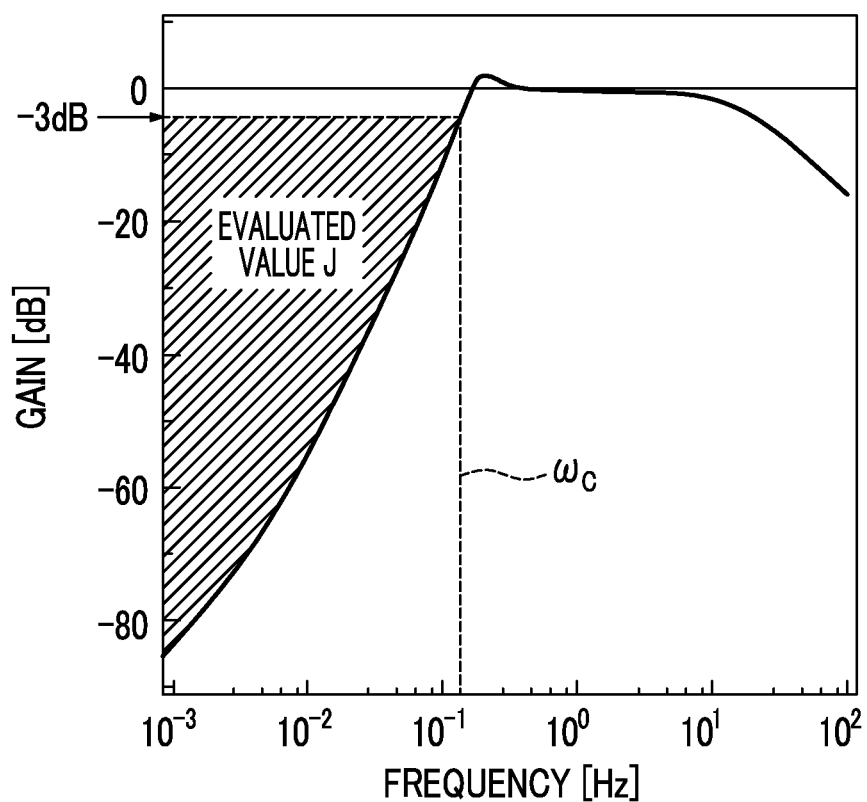
FIG. 6 is a graph illustrating an example of an area that corresponds to an evaluated value according to the embodiment of the present invention.

Specifically, in Step 106 (S106), the area that is surrounded by the gain properties of the transfer function in a low frequency region (for example, a region in which the frequency is less than or equal to one) and a predetermined threshold is calculated as the evaluated value J. In the present embodiment, the threshold is set as a predetermined gain (hereinafter, referred to as "gain threshold"), and the gain threshold is set to, as an example, −3 dB. Then, as illustrated in FIG. 6, the evaluated value J that corresponds to the area surrounded by the gain threshold set as y=−3 dB and the gain properties is calculated. This evaluated value J is the information related to the position deviation.

The evaluated value J for each proportional gain Kc is represented by the following Equation (1), given that the frequency at the intersection of the gain threshold and a gain property $G_{re}(j\omega)$ is $\omega_c$.

$$J(K_c) = -\int_0^{\omega_c} |G_{re}(j\omega)| d\omega \tag{1}$$

It is indicated that the position deviation is decreased as the evaluated value J is increased.

Since the properties of the transfer function are from the position command to the position deviation, the transfer function means that the position deviation is unlikely to be generated as the gain is equal to 0 dB or less. That is, it is indicated that the position deviation is decreased as the evaluated value J that corresponds to a value obtained by integrating a predetermined region in which the gain is less than or equal to 0 dB is increased.

Next, in Step 108 (S108), a determination of whether or not all of the proportional gains Kc are temporarily selected is performed, and, in a case of a positive determination, a transition is made to Step 110 (S110). Meanwhile, in a case of a negative determination, a transition is made to Step 100 (S100). A new proportional gain Kc is temporarily selected, and the evaluated value J is calculated in accordance with the temporarily selected proportional gain Kc.

In Step 110 (S110), the evaluated values J of the temporarily selected proportional gains Kc are compared with each other, and the proportional gain Kc at which the evaluated value J is the largest is derived.

Figure 7:
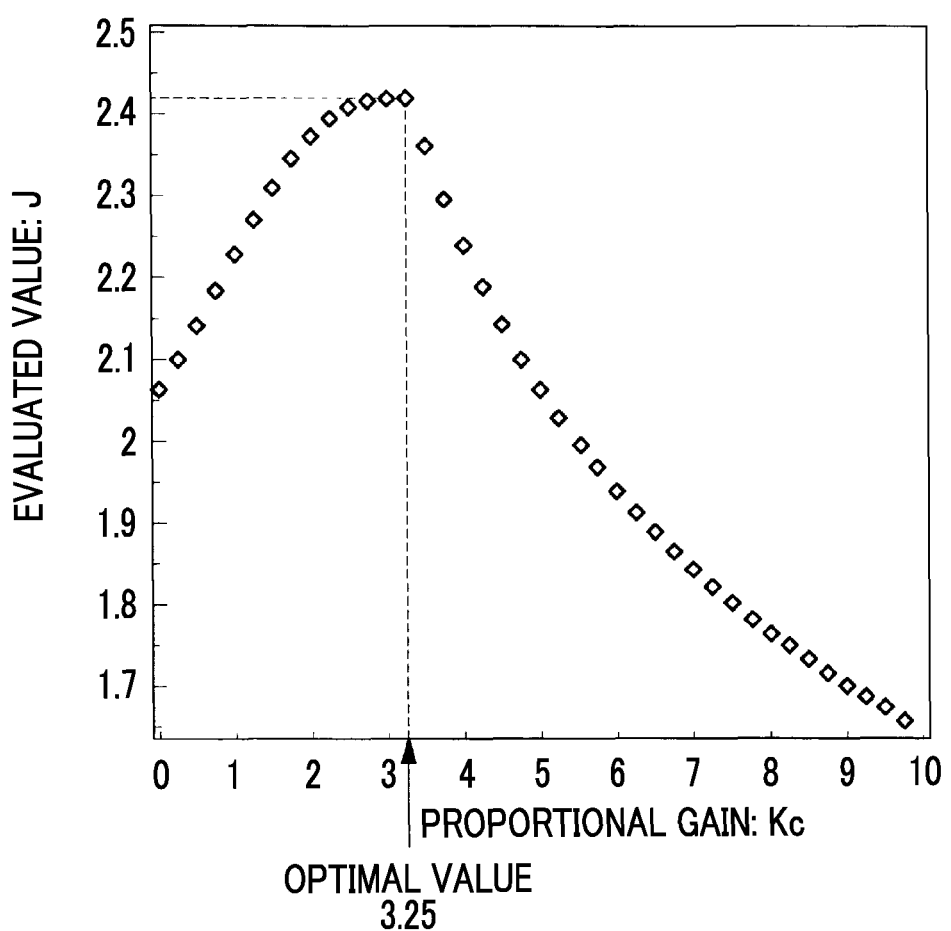
FIG. 7 is a graph illustrating an example of changes in the evaluated value with respect to a proportional gain according to the embodiment of the present invention.

FIG. 7 is a graph illustrating an example of changes in the evaluated value J with respect to the proportional gain Kc.

In the example of FIG. 7, the evaluated value J is the largest in a case of proportional gain Kc=3.25.

Figure 8:
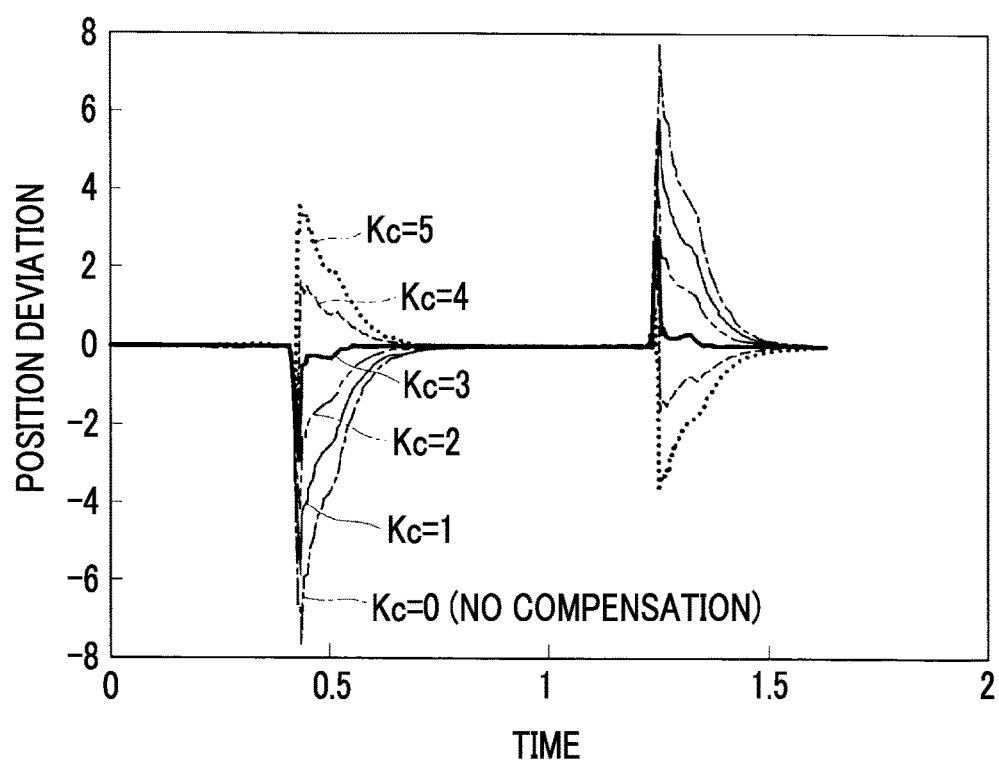
FIG. 8 is a graph illustrating an example of changes in a position deviation in response to the proportional gain according to the embodiment of the present invention.

FIG. 8 is a simulation result that illustrates the position deviation in a case of proportional gain Kc=0, 1, 2, 3, 4, and 5 with respect to the model of the machine apparatus 12 used in derivation of the result illustrated in FIG. 7. In FIG. 8, the horizontal axis is time, and the vertical axis is the position deviation.

The position deviation is the largest in a case of proportional gain Kc=0, that is, in a case where the friction compensation does not function. The position deviation is decreased as the proportional gain Kc is increased, and the position deviation is the smallest in a case of proportional gain Kc=3 among the proportional gains Kc. Meanwhile, the compensation is rendered excessive in a case of proportional gain Kc=4 and 5, and the position deviation is increased.

As illustrated in FIG. 8, the position deviation is the smallest in a case of proportional gain Kc=3 that is close to proportion gain Kc=3.25 at which the evaluated value J is the largest in the example of FIG. 7.

As such, since the extent to which the position deviation is generated in the current system configuration can be estimated from the gain properties of the transfer function of the machine system 10, the proportional gain Kc by which the estimated friction value is multiplied is easily optimized.

Next, in Step 112 (S112), the value of the proportional gain Kc at which the estimated value J is the largest is determined as the proportional gain Kc that is actually used in the amplitude phase adjustment unit 46 and is set for the amplitude phase adjustment unit 46, and the proportional gain determination process is ended.

The proportional gain determination process is performed for, as an example, setting of the proportional gain Kc before shipment of the machine system 10. However, the invention is not limited thereto. The machine system may be connected with the information processing apparatus to enable online identification of friction of the machine apparatus 12, and the proportional gain determination process may be performed to newly set the proportional gain Kc online in a case of updating the viscous friction parameter of the machine apparatus 12.

Figure 9:
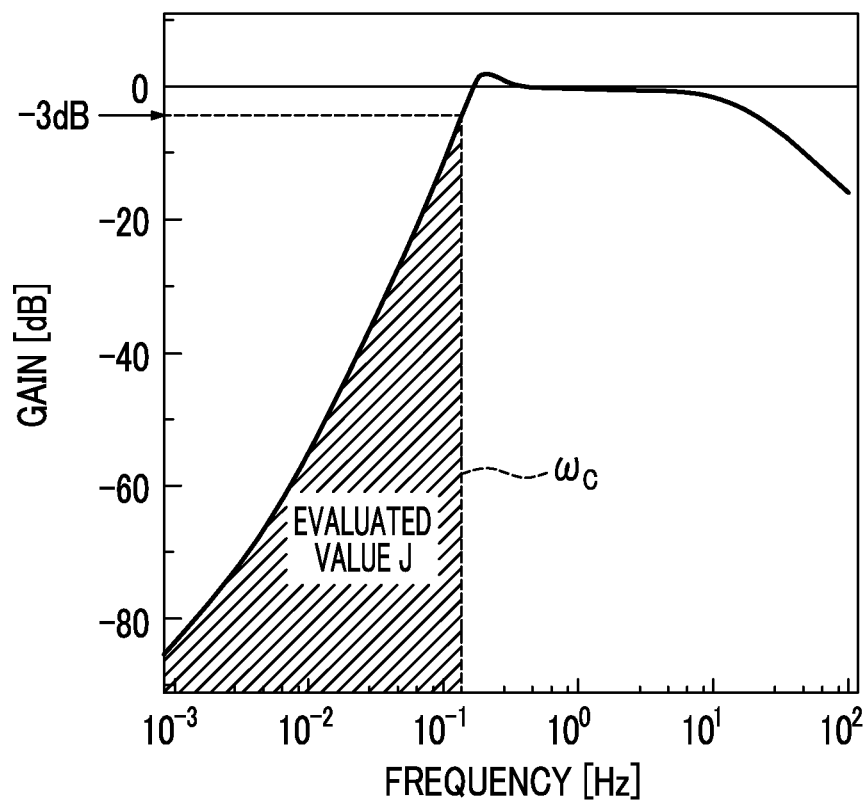
FIG. 9 is a graph illustrating another example of the area that corresponds to the evaluated value according to the embodiment of the present invention.

While the evaluated value J is calculated from the area surrounded by the gain threshold and the gain properties in the above embodiment, the invention is not limited thereto. As illustrated in FIG. 9, the evaluated value J may be calculated from the area that is surrounded by the gain properties and the frequency $\omega_c$ ($x=\omega_c$) corresponding to the gain threshold.

In this case, it is indicated that the position deviation is decreased as the evaluated value J is decreased.

Figure 10:
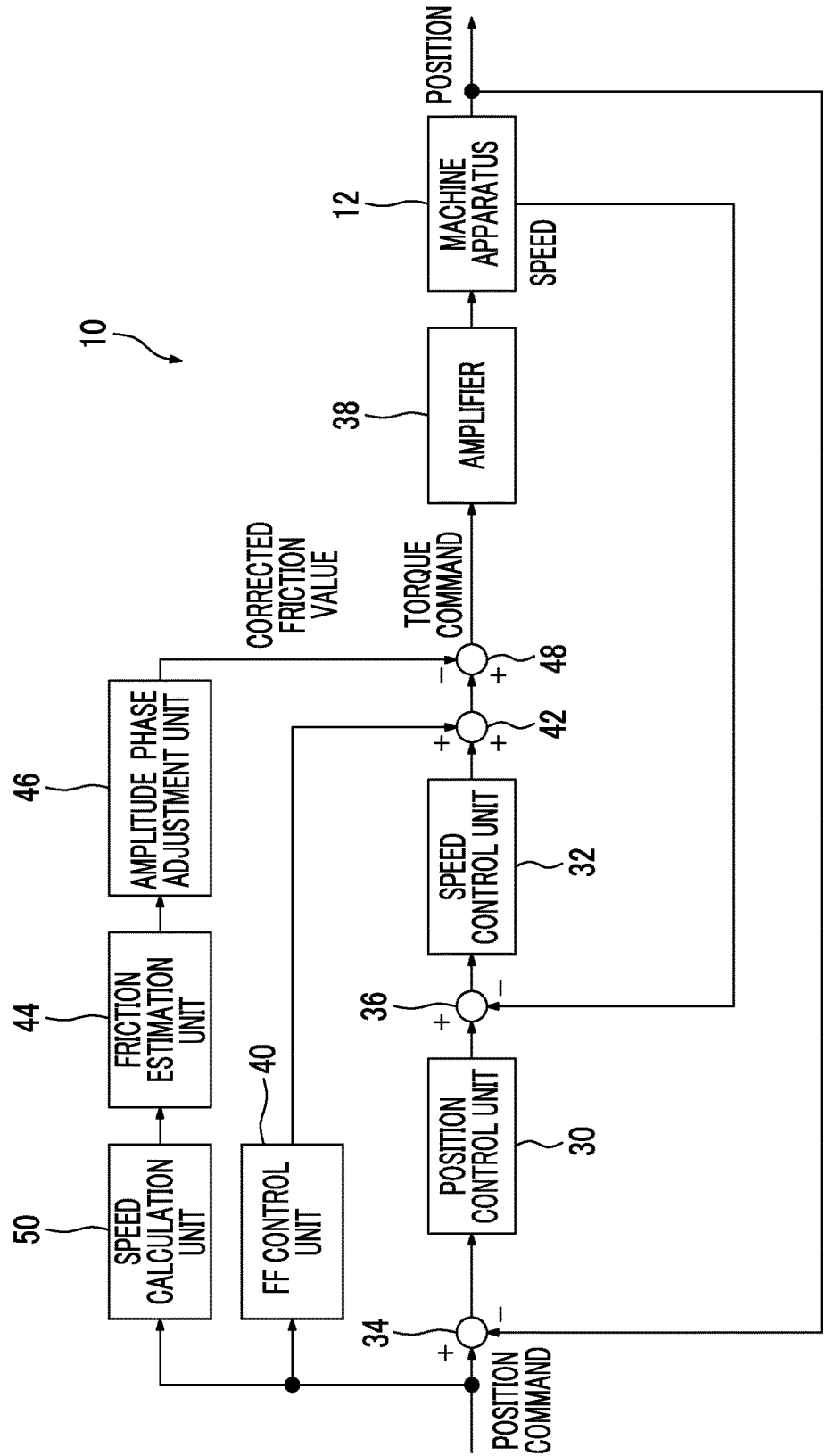
FIG. 10 is a functional block diagram illustrating a configuration of the control device according to the embodiment of the present invention.

The friction estimation unit 44 and the amplitude phase adjustment unit 46 may be arranged as a part of the FF control unit 40 as illustrated in FIG. 10. The friction estimation unit 44 receives input of a speed signal that is calculated by a speed calculation unit 50 from the position command. The estimated friction value produced in the machine apparatus 12 is calculated by arranging the amplitude phase adjustment unit 46 in a rear stage of the friction estimation unit 44. The estimated friction value calculated is output to the correction unit 48.

The amplitude phase adjustment unit 46 may perform phase compensation as represented in Equation (2). In Equation (2), a phase lead time constant is denoted by T1, and a phase lag time constant is denoted by T2.

$$Gf(s) = Kc \times \frac{(T1s+1)}{(T2s+1)} \qquad (2)$$

As described heretofore, the control device 14 for the machine apparatus 12 according to the present embodiment includes the speed control unit 32 that calculates the torque command for the machine apparatus 12, the friction estimation unit 44 that calculates the estimated value of the friction force produced in the machine apparatus 12, the amplitude phase adjustment unit that calculates the corrected friction value by multiplying the friction force estimated by the friction estimation unit 44 by the proportional gain Kc, and the correction unit 48 that corrects the torque command using the corrected friction value calculated by the amplitude phase adjustment unit 46. The proportional gain Kc is determined on the basis of the gain properties of the transfer function of the machine apparatus 12 from the position command to the position deviation.

Therefore, the control device 14 according to the present embodiment can further improve the accuracy of position control of the machine apparatus 12.

While the present invention is heretofore described by using the above embodiment, the technical scope of the present invention is not limited to the scope described in the above embodiment. Various modifications or improvements can be carried out to the above embodiment to the extent not departing from the gist of the invention, and the embodiments to which modifications or improvements are carried out also fall within the technical scope of the present invention. In addition, the embodiments may be appropriately combined.

REFERENCE SIGNS LIST

10 MACHINE SYSTEM
12 MACHINE APPARATUS
14 CONTROL DEVICE
32 SPEED CONTROL UNIT
44 FRICTION ESTIMATION UNIT
46 AMPLITUDE PHASE ADJUSTMENT UNIT
48 CORRECTION UNIT

The invention claimed is:

1. A control device for a machine apparatus, the device comprising:
    torque command calculation means for calculating a torque command for the machine apparatus;
    friction estimation means for calculating an estimated value of a friction force produced in the machine apparatus;
    adjustment means for calculating a corrected value by multiplying the estimated value calculated by the friction estimation means by a predetermined gain; and
    correction means for correcting the torque command calculated by the torque command calculation means using the corrected value calculated by the adjustment means,
    wherein the gain is determined on the basis of gain properties of a transfer function of the machine apparatus from a position command to a position deviation.

2. The control device for a machine apparatus according to claim 1,
    wherein the gain is determined on the basis of an area that is surrounded by the gain properties of the transfer function in a low frequency region and a predetermined threshold.

3. The control device for a machine apparatus according to claim 2,
    wherein the transfer function is derived by using linear analysis.

4. The control device for a machine apparatus according to claim 1,
wherein the transfer function is derived by using linear analysis.

5. A gain determination method for friction compensation used in a control device that calculates an estimated value of a friction force produced in a machine apparatus, calculates a corrected value by multiplying the calculated estimated value by a predetermined gain, and corrects a torque command for the machine apparatus using the corrected value, the method comprising:
- a step of deriving a transfer function of the machine apparatus from a position command to a position deviation; and
- a step of determining the gain on the basis of gain properties of the transfer function.

* * * * *